United States Patent

[11] 3,524,386

| [72] | Inventor | Sylvester R. Cudnohufsky<br>1290 Lake Angelus Shore Drive, Pontiac,<br>Michigan 48055 |
|---|---|---|
| [21] | Appl. No. | 736,127 |
| [22] | Filed | June 11, 1968<br>Continuation-in-part of Ser. No. 693,403,<br>Dec. 26, 1967, now abandoned. |
| [45] | Patented | Aug. 18, 1970 |

[54] HYDRAULIC SYSTEM FOR MACHINE TOOL CONTROL
3 Claims, 2 Drawing Figs.

[52] U.S. Cl. .................................................. 91/461,
91/468, 137/495, 137/501
[51] Int. Cl. .......................................... F15b 11/04,
F16k 31/12
[50] Field of Search ........................................ 91/445,
445PR, 446, 447, 461, 468; 137/495, 501

[56] References Cited
UNITED STATES PATENTS

| 1,985,443 | 12/1934 | Clute | 137/501X |
| 2,071,781 | 2/1937 | Douglas | 60/52 |
| 2,272,684 | 2/1942 | Vickers | 60/52 |
| 2,373,167 | 4/1945 | Cherry et al. | 91/445X |
| 2,588,284 | 3/1952 | Otis | 137/501X |
| 2,731,980 | 1/1956 | Diefenderfer | 137/495X |
| 2,790,425 | 4/1957 | Norris | 91/445X |
| 2,796,080 | 6/1957 | Presnell | 91/445X |
| 2,878,784 | 3/1959 | Pilch | 91/445X |
| 3,115,891 | 12/1963 | Kimm | 137/495 |

*Primary Examiner*— Martin P. Schwadron
*Assistant Examiner*— Irwin C. Cohen
*Attorney*— J. Maguire ABSTRACT: A hydraulic system for controlling the movement of a machine tool slide which includes a pressure compensated flow control valve for regulating the rate of travel of the slide, the flow control valve being of the type which includes a flow controlling valve spool spring biased toward open position and fluid control means associated with the flow control valve for shifting the valve spool toward closed position against the bias of the spring when it is desired to arrest movement of the machine tool slide.

INVENTOR.
SYLVESTER CUDNOHUFSKY

INVENTOR.
SYLVESTER CUDNOHUFSKY

HYDRAULIC SYSTEM FOR MACHINE TOOL CONTROL

This invention relates to hydraulic systems which incorporate a pressure compensated flow control valve for controlling the speed of a hydraulic actuator.

This application is a continuation-in-part of my application Serial No. 693,403, filed December 26, 1967, and now abandoned.

In various hydraulic circuits employed for controlling a hydraulic actuator (such as a cylinder) an adjustable, pressure compensated flow control valve is employed for regulating the rate at which oil is directed to or exhausted from the actuator to thereby control the speed at which the actuator operates. Such flow control valves usually embody a flow controlling valve spool normally spring biased toward open position and which modulates toward closed position in response to an increase in the pressure differential across the valve to maintain the flow through the flow control valve at a substantially uniform rate. With a flow control valve of this type, when the flow of fluid directed to or exhausted from the actuator is stopped so as to arrest movement of the actuator, the pressure differential across the flow control valve drops to zero and the valve spool shifts to its fully open position under the bias of the spring. Thereafter, when the flow through the actuator is resumed, the spool valve has to shift from the fully open position to a partially closed position in order to reduce the flow to the predetermined rate for which the flow control is adjusted. However, since the valve spool is fully open, the flow through the valve at least momentarily is initially substantially higher than the desired rate and there is a tendency for the actuator to accelerate abruptly and rapidly. In the case of a machine tool (such as a lathe) where the actuator is a cylinder that controls the movement of the tool slide this abrupt and rapid acceleration causes the tool slide to jump forwardly in the feed direction and often leads to tool breakage and damage to the workpiece.

The object of the present invention is to eliminate such rapid acceleration or jumping of the actuator in a relatively simple and economical manner.

More specifically, the present invention has for its object the provision of a control means associated with such pressure compensated flow control valve for shifting the valve spool to the fully closed position when it is desired to stop the actuator so that, when the flow through the actuator is resumed, the valve spool shifts gradually and at a predetermined maximum rate from the fully closed to the partially open position corresponding to the desired flow rate, as distinguished from a conventional arrangement wherein the valve spool has to shift from the fully open, maximum flow position to the partially open, restricted flow position. With the present invention the hydraulic actuator accelerates smoothly at a predetermined level of acceleration to the desired regulated speed.

Figure 1:
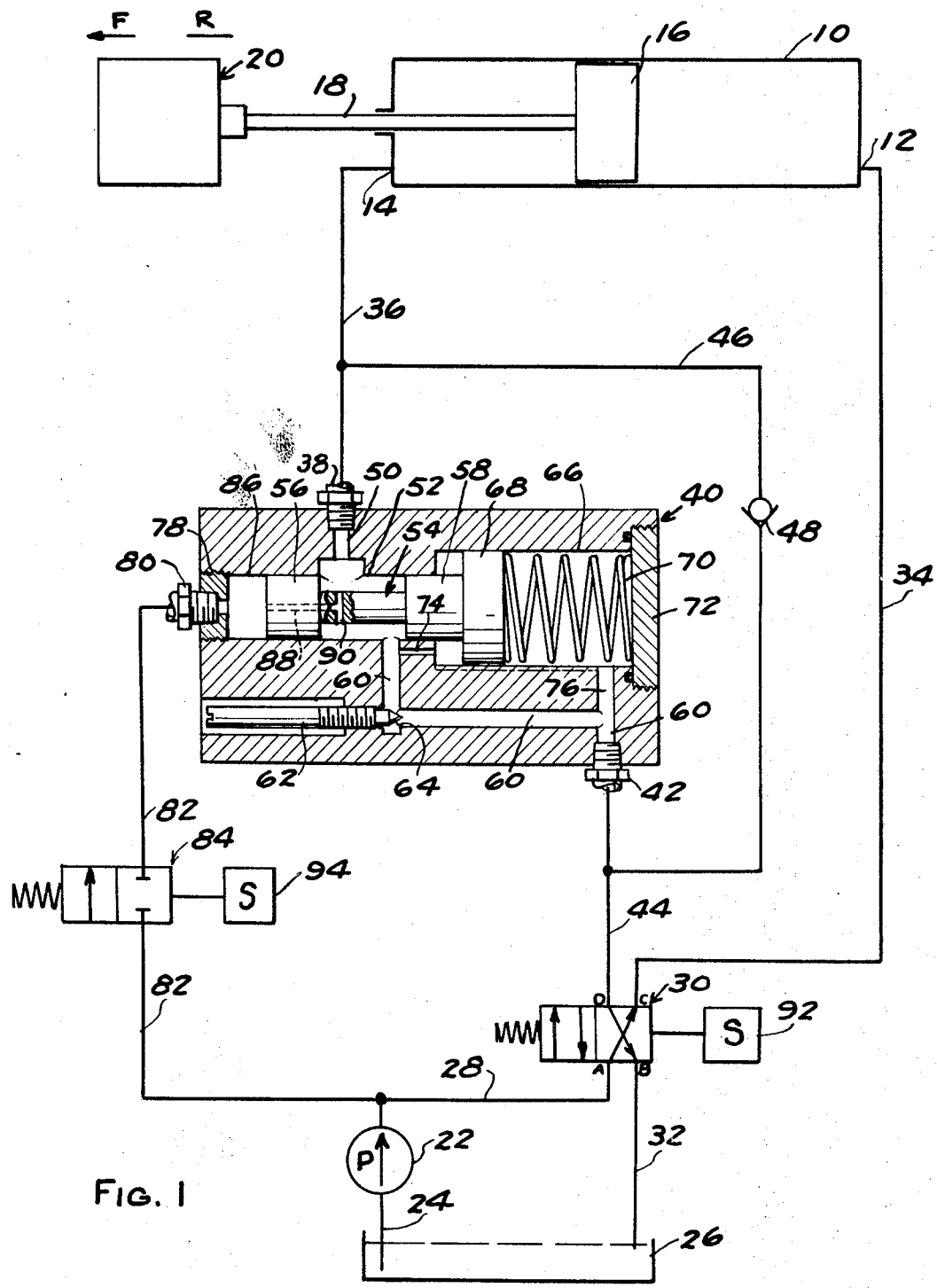
FIG. 1 is a schematic view, partly in section, of a hydraulic system in accordance with the present invention.

Referring to FIG. 1 there is illustrated a hydraulic cylinder 10 having a port 12 at its head end and a port 14 at its rod end. A piston 16 slideably arranged within cylinder 10 has its rod 18 connected with a tool slide 20.

The supply of pressure fluid for operating cylinder 10 is provided by a pump 22 having its inlet connected by a line 24 with a sump 26. The pressure side of pump 22 is connected by a line 28 with port A of a solenoid-operated, two-position, four-way valve 30. Port B of valve 30 is connected by a line 32 with sump 26. Port C of valve 30 is connected by a line 34 with port 12 of cylinder 10. Port 14 of cylinder 10 is connected by a line 36 with an inlet 38 of a pressure compensated flow control valve 40. The outlet 42 of valve 40 connects with port D of valve 30 by a line 44. Lines 36 and 44 are interconnected by a bypass line 46 in which there is arranged a check valve 48 which permits flow through line 46 only in the direction from valve 30 to port 14.

An inlet passageway 50 in valve 40 extends from inlet 38 to a bore 52. Within bore 52 there is slideably arranged a valve spool 54 having a flow controlling valve piston 56 at one end and a pilot piston 58 adjacent its opposite end. Between the pistons 56, 58 spool 54 is of reduced diameter so as to establish fluid communication between inlet passageway 50 and outlet passageway 60 when passageway 50 is not completely blocked by valve piston 56. A needle valve 62 is arranged in outlet passageway 60 for controlling the effective size of an orifice 64. Passageway 60 extends to outlet 42 on valve 40.

Valve 40 is also formed with an enlarged bore 66 at one end of bore 52 to slideably receive a piston 68 formed integrally with spool 54 at the end of pilot piston 58. A compression spring 70 in bore 66 bears against piston 68 to bias spool 54 in a direction to the left as viewed in FIG. 1; that is, to the fully open position. The outer end of bore 66 is sealed by a cover plate 72. Bore 66 at one side of piston 68 is connected with exhaust passageway 60 on the upstream side of needle valve 62 by a passageway 74. On the downstream side of needle valve 62 exhaust passageway 60 is connected with bore 66 on the other side of piston 68 by a passageway 76.

Chamber 86 in bore 52 adjacent the free end of valve piston 56 communicates with the portion of bore 52 between pistons 56 and 58 by means of bleed passageways 88 and 90 in spool 54. Passageways 88,90 prevent hydraulic locking of spool 54, provide a certain degree of viscous damping of the spool and control the maximum rate of spool acceleration.

The system thus far described, including valve 40, is generally conventional. Pressure compensated flow control valves substantially the same as valve 40 as thus far described are obtainable from any of several manufacturers. In a conventional system of this type, a three-position valve would usually be employed in place of valve 30, the valve having a closed center position wherein flow between pump 22 and cylinder 10 is blocked. The valve would be actuated to the closed position in order to stop the travel of slide 20. However with such an arrangement, when the flow to cylinder 10 is blocked, spool 54, under the bias of spring 70, would shift to the left to the fully open position and, when flow of oil to the cylinder is resumed, the initial flow rate would immediately rise to the maximum value corresponding to the wide open position of spool 54 and then decrease until spool 54 reached the partially closed position corresponding to the preselected flow rate determined by the setting of needle valve 62. However the maximum speed with which spool 54 can shift toward closed position is determined by the size of bleed passageways 88,90 and thus for at least a short interval of time the flow rate is usually far in excess of the preselected rate. As a consequence, the tool slide would immediately jump forwardly upon resumption of flow.

In accordance with the present invention valve 40 is also provided with a control port 78 which communicates with chamber 86 adjacent the free end of valve piston 56. An inlet fitting 80 in port 78 is connected to the pressure line 28 of pump 22 by a line 82. The flow through line 82 is controlled by a solenoid-operated, two-position, two-way valve 84.

Assuming that movement of slide 20 to the left is the feed direction of the tool and that movement of slide 20 to the right retracts the tool, then in order to move the slide in the feed direction it is necessary to admit pressurized fluid to cylinder 10 at port 12 and exhaust fluid from the cylinder at port 14. Accordingly, to advance the slide, solenoid 92 of valve 30 is energized to the positon illustrated in FIG. 1 to connect pressure line 28 with line 34 and to connect line 44 with the sump line 32. Solenoid 94 of valve 84 is also energized to block the flow of pressurized fluid through line 82. Thus, oil under pressure is admitted to port 12 causing piston 16 and slide 20 to travel in the feed direction. Oil from the rod end of cylinder 10 exhausts through port 14 and is directed to valve 40 through line 36. The differential pressure on opposite sides of piston 68 produced by the setting of needle valve 62 and the bias of spring 70 causes spool 54 to modulate to a positon wherein the forces acting on the opposite sides of piston 68 are equalized. Under these conditions valve piston 56 will partially block the flow through inlet passageway 50 and the rate of travel of the slide will be determined by the setting of needle valve 62. Thus in response to pressure variations in inlet passageway 50 spool 54 will shift to vary the effective size of the passageway and thereby maintain the flow through valve 40 at a relatively constant value as determined by the setting of needle valve 62. Thus slide 20 will travel in the feed direction at a uniform speed.

If while the slide 20 is travelling in the feed direction (solenoid 92 being energized as shown) it is desired to stop the slide, solenoid 94 is de-energized so that oil under pressure is directed from pump 22 through line 82 to port 80. With solenoid 94 de-energized the pressure at port 78 (neglecting line friction) is equal to the pressure developed by pump 22 and this pressure, considering the relative areas, is always sufficient to overcome the bias of spring 70. Spool 54 is therefore shifted to the right as viewed in FIG. 1 to the fully closed position blocking inlet passageway 50 and immediately stopping the slide.

When it is desired to resume movement of the slide in the feed direction, solenoid 94 is energized thus blocking the flow of fluid to control port 78 and allowing the pressure in chamber 86 to equalize with that in bore 52 to the right of piston 56 by restrictive flow through passageways 88,90 which are dimensioned to serve as capillary restrictors. Spool 54 thus shifts gradually and progressively at a predetermined maximum rate from the fully closed position to the partially open position under the bias of spring 70 to thus gradually increase the flow rate to the preselected value determined by the setting of needle valve 62. Since the flow rate is gradually increased, piston 16 and therefore slide 20 accelerate smoothly to the preselected speed. Tool breakage and damage to the workpiece is thereby prevented.

When it is desired to retract slide 20, solenoid 92 is de-energized so that pressure line 28 connects with line 44 and line 34 from the head end of the cylinder discharges to sump 26 through line 32. With valve 92 de-energized, oil under pressure is directed from pump 22 through lines 44, 46 and 36 to the rod end of the cylinder. Oil is exhausted from the head end of cylinder to sump 26 through lines 34 and 32. During retraction of slide 20 it is preferred to maintain solenoid 94 de-energized so that, if it is desired to suddenly stop the slide, this can be accomplished by merely energizing solenoid 92.

Figure 2:
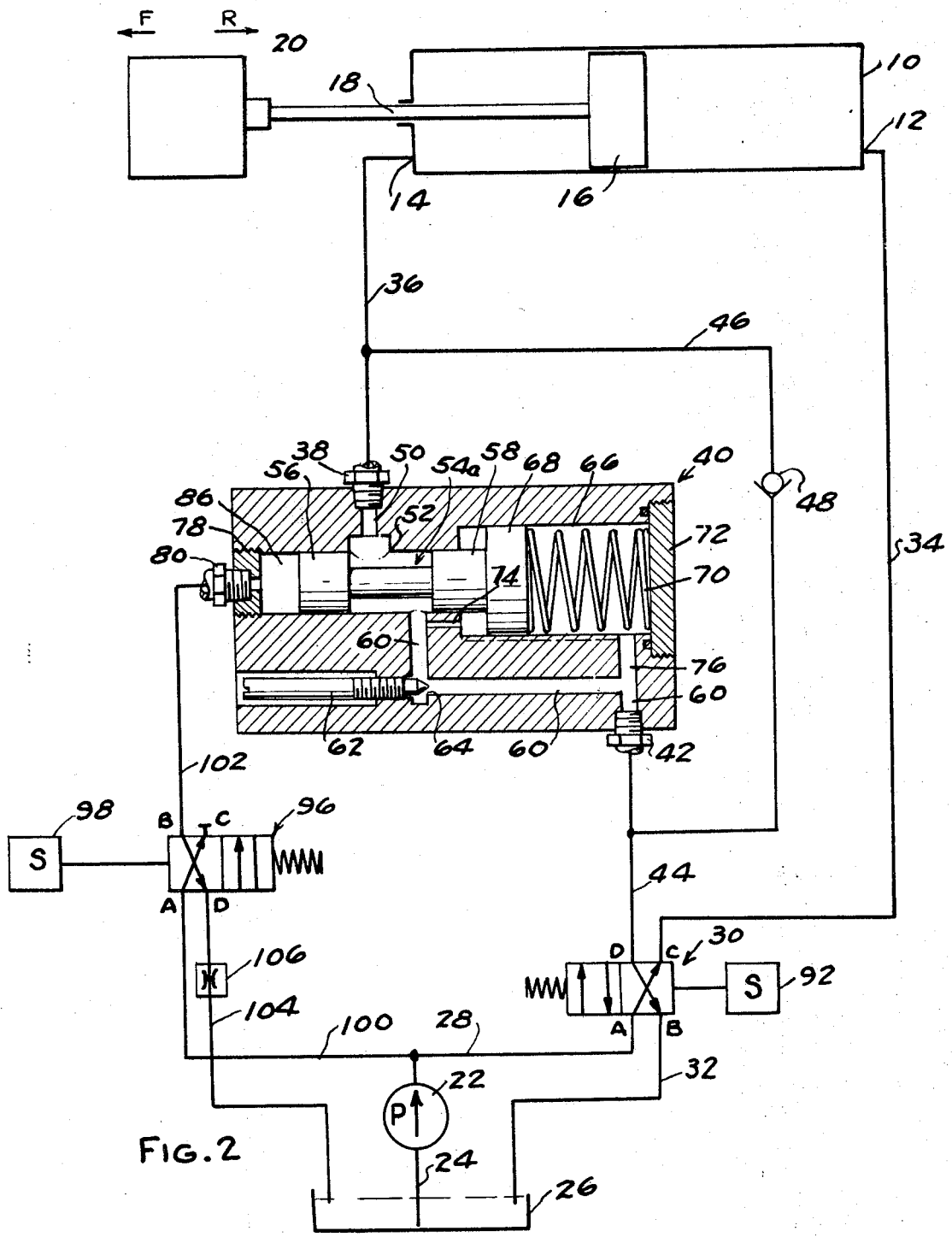
FIGURE 2 is a view similar to FIG. 1 and illustrating a modified form of hydraulic circuit.

The hydraulic system illustrated in FIG. 2 differs only slightly from that illustrated in FIG. 1. In the arrangement of FIG. 2 spool 54a in valve 40 is a solid spool and is not provided with bleed passageways such as indicated at 88 and 90 in FIG. 1. Likewise, in the arrangement of FIG. 2 the flow of oil between pump 22 and port 78 is controlled by a solenoid-operated, two-position, four-way valve 96, the solenoid of which is designated 98. In the de-energized condition of solenoid 98 port A of valve 96 communicates with port B so that pressure line 100 from pump 22 connects directly with line 102 to inlet fitting 80. When solenoid 98 is energized, port A connects with plugged port C and port B connects with port D so that pressure line 100 is plugged at port C and line 102 connects to sump thought line 104 and a valve 106. Valve 106 may be any suitable flow control valve, such as a fixed orifice valve.

The arrangement illustrated in FIG. 2 operates in somewhat the same manner as that illustrated in FIG. 1 except that when the system is in the feed cycle, that is, with solenoids 92 and 98 energized, the maximum rate of travel of spool 54a is controlled by valve 106 rather than by bleed passageways 88,90 as in FIG. 1. When solenoid 98 is de-energized pressure line 100 is connected directly to line 102 extending to inlet fitting 80 and the slide is stopped in the same manner as previously described in conneciton with FIG. 1. When fluid flow is resumed by energizing solenoid 98, the rate of flow increases gradually since the maximum speed with which spool 54a can shift toward open position is controlled by the restriction in valve 106.

In both systems illustrated herein movement of the slide is arrested by applying a force to the valve spool in a direction which shifts the spool to its fully closed position. Although the means specifically illustrated are hydraulically actuated, it will be appreciated that any suitable means may be employed for applying a force to the left end of spools 54,54a sufficient to shift the spools to the fully closed position in order to arrest movement of piston 16. Such means may obviously be mechanically actuated, hydraulically actuated or even pneumatically actuated.

I claim:
1. In combination a hydraulically powered actuator having an inlet connected to a source of pressurized hydraulic fluid and an outlet, said actuator having an output member movable at a speed established by the flow rate of the hydraulic working fluid discharging from the outlet of the actuator, a pressure compensated flow control valve for controlling the operation of said actuator at a uniform rate irrespective of variations in the load on the output member of the actuator, said flow control valve having an inlet connected to the outlet of the actuator and an outlet connected to sump, said flow control valve having an internal passageway extending from the inlet to the outlet thereof, said flow control valve having a guide bore therein, a valve spool shiftable axially in said guide bore for increasing and decreasing the size of the intersection between said passageway and said guide bore on the upstream side of the valve spool, means forming an adjustable restriction in said passageway on the downstream side of said valve spool for pressurizing a portion of said passageway between the valve spool and the outlet of the flow control valve, said guide bore having an enlarged counterbore portion at one end thereof, said spool including a piston axially shiftable in said counterbore portion, a spring acting on one side of said piston and biasing the valve spool in one direction to increase the effective size of said intersection, a bypass conduit between said portion of the passageway and the counterbore portion on the opposite side of said piston for urging the spool in the opposite direction against the bias of said spring for decreasing the effective size of said intersection whereby the valve spool shifts axially in said one direction to increase the effective size of said intersection in response to a decrease in pressure at the inlet of the flow control valve and shifts axially in the opposite direction in response to an increase in pressure at the inlet of said flow control valve to decrease the effective size of said intersection in response to an increase in the pressure at said inlet of the flow control valve to maintain the flow rate from the outlet of the actuator at a substantially uniform value, and control means for arresting movement of the actuator while the inlet thereof is subject to the pressure of said source comprising means for selectively directing hydraulic fluid against said valve spool at a pressure greater than the pressure at the inlet of the flow control valve urging said valve spool in said opposite direction against the bias of said spring to a position completely closing said intersection between said passageway and guide bore.

2. The combination set forth in Claim 1 wherein said control means comprises means forming a passageway extending from said source of pressure to said flow control valve for directing hydraulic fluid to said bore at a pressure greater than the pressure at the inlet of the flow control valve.

3. The combination set forth in Claim 2 including a shut-off valve in said last-mentioned passageway for controlling the flow of pressurized hydraulic fluid therein.